Sept. 29, 1936.  L. W. BLAU  2,055,477
ELECTRICAL CIRCUITS FOR SEISMIC PROSPECTING
Filed Dec. 30, 1933  2 Sheets-Sheet 1

Ludwig W. Blau Inventor
W. F. Weigester Attorney

Sept. 29, 1936.  L. W. BLAU  2,055,477
ELECTRICAL CIRCUITS FOR SEISMIC PROSPECTING
Filed Dec. 30, 1933   2 Sheets-Sheet 2

Ludwig W. Blau Inventor
W. E. Currie Attorney.

Patented Sept. 29, 1936

2,055,477

UNITED STATES PATENT OFFICE 2,055,477

ELECTRICAL CIRCUITS FOR SEISMIC PROSPECTING

Ludwig W. Blau, Houston, Tex., assignor to Standard Oil Development Company, a corporation of Delaware Application December 30, 1933, Serial No. 704,799

11 Claims. (Cl. 177—352)

In applied seismology, and especially in reflection shooting, it is very essential that the first arrivals of waves be recorded, for a reason that erroneous results will be obtained in calculating the depth of the reflection layer if the time of first arrival of the wave is not accurately recorded. It is difficult to record the first arrival because the first cycle of a reflected or a refracted wave is as a rule small; the second cycle is larger and the maximum amplitude is as a rule not reached until the third cycle.

It is an object of this invention to increase the ratio of first cycle amplitude to second cycle amplitude of electric pulsations of given amplitude.

Other objects will be apparent from the specification and from the accompanying drawings in which latter—

Figure 1:
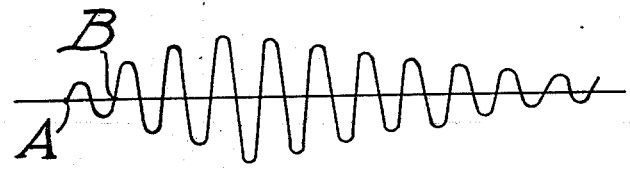
Fig. 1 is a diagrammatic view of a reflected wave as recorded without being subjected to the circuits of the invention.

Referring particularly to Fig. 1, the wave is represented as arriving at the point marked A. The first cycle is constituted by the part between the point marked A and the point marked B. It is seen that the first cycle is relatively small and that the second and third cycles are of progressively increasing amplitude. It is easy to see that with insufficient sensitivity, or with recording apparatus which does not respond vigorously to the first small amplitudes, the point B or even some later point might be picked as the arrival of the wave.

Figure 2:
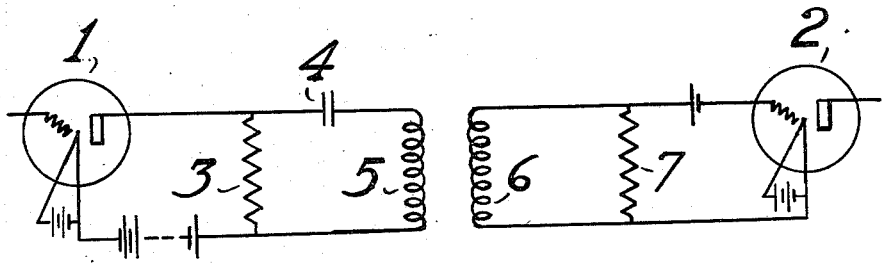
Fig. 2 is a diagrammatic representation of a preferred form of circuit.
Figure 3:
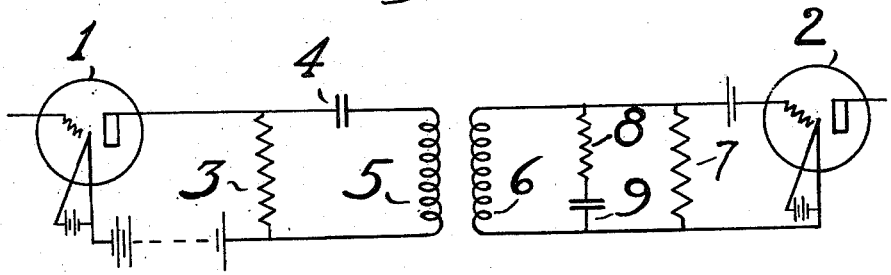
Fig. 3 is a diagrammatic representation of a modified form of circuit.

I have discovered that it is possible to design electrical or mechanical apparatus which will record the beginning of the waves larger, relative to the later amplitudes, than they occur in the ground. I have been able to exaggerate the first cycle as much as five times. A mechanical system capable of recording the first cycle 35% larger was described by me in the Journal of the Franklin Institute, vol. 206, No. 3, September, 1928, pp. 355–378. Electrical circuits have now been devised which will emphasize the first cycle many times. In Figs. 2 and 3, two such circuits are shown.

In Fig. 2, numerals 1 and 2 designate vacuum tubes which may be three-electrode, screen grid, or pentode tubes. To the high-potential side of a plate resistor 3 are connected a condenser 4 and the primary 5 of a transformer in series. Across the secondary 6 of this transformer a grid resistor 7 is connected; this resistor 7 is connected into the grid circuit of the tube 2. With an ideal transformer, this circuit will magnify the first cycle two times if the resistors, the condenser, and the transformer are properly chosen. By an ideal transformer is meant one in which the square of the mutual inductance is equal to the product of the inductances of the primary and secondary windings.

In Fig. 3, I show the electrical circuit of Fig. 2 with a resistor 8 and a condenser 9 in series connected in parallel with the resistor 7 across the secondary 6 of the transformer. With an ideal transformer and with properly chosen resistors, condensers and transformer, this circuit will magnify the first cycle three times.

In the choice of the constants the frequency of the wave and the damping of the recording apparatus are of the greatest importance, the recording apparatus being the amplifier as well as the recording means proper, such as a string or moving coil galvanometer. I have found that if the natural undamped frequency of the recording apparatus is the same as the frequency of the wave to be recorded and the damping of the recording circuit is about one-half "critical", the first cycle is recorded with its natural amplitude. As the damping is increased, the ratio of the first cycle amplitude to the amplitude of the second cycle is greater on the record than in the wave recorded. This ratio increases with increasing damping and approaches the value two when the damping is about twelve times critical for a circuit such as the one given in Fig. 2. This means that if, in the wave to be recorded, the first cycle had one-half as great an amplitude as the second cycle, then on the record the first cycle would have the same amplitude as the second. It is not necessary to tune the circuit exactly to the frequency of the wave; on account of the large damping used, there may be a difference of several cycles. For example, the natural frequency of the electrical circuit may be less than the frequency of the electrical vibrations to be recorded. I have found that with critical damping and a forcing vibration of constant amplitude, the first recorded cycle is 20% greater than the second, with twice critical 45% greater, with five times critical 75% greater and about 95% greater with ten times critical damping.

Now I have found that the frequencies of seismic waves depend on the geologic age of the rocks or sediments through which the waves travel and on the depth to which they penetrate into the earth. Thus, in the Gulf Coast region of the United States, reflections which penetrate to less than about two thousand feet have a frequency of about 40 cycles. The frequency decreases with increasing depth; reflections which penetrate to a depth of 10,000 feet have a frequency of about 30 cycles. The range for the Gulf Coast is therefore from 30 to 40 cycles. Approximately the same conditions have been observed in Venezuela. In Oklahoma, higher frequencies are encountered which is to be ascribed to the fact that the rocks are geologically older. Reflections which penetrate to a depth of about 1000 feet have a frequency of about 55 cycles while 6000 foot reflections have a frequency of about 45 cycles. The range is therefore from 45 to 55 cycles in Oklahoma. In Pennsylvania, which is geologically older than Oklahoma, the frequency range is from about 55 to 70 cycles.

In order, then, to achieve the desired exaggeration of the amplitude of the first cycle, it is necessary to choose such values of the condenser 4 and of the inductance 5 in Figs. 2 and 3 that the combination will resonate at about 35 cycles in apparatus used for recording reflections in the Gulf Coast, about 50 cycles in Oklahoma, and about 62 cycles in Pennsylvania. The values of the inductance 6 and of the condenser 9 in Fig. 3 must be chosen in the same manner. The values of the different resistors must be such that the combination will have the damping necessary for the desired magnification of the amplitude of the first cycle. Greater magnification of the first cycle can be attained with poor transformers, but their use is undesirable on account of the acompanying losses. A poor transformer may be defined as one which has high losses, which losses generally become most apparent at low and high frequencies. It is for this reason advisable to use more stages of such circuits as have been illustrated or of their equivalents.

Figure 4:
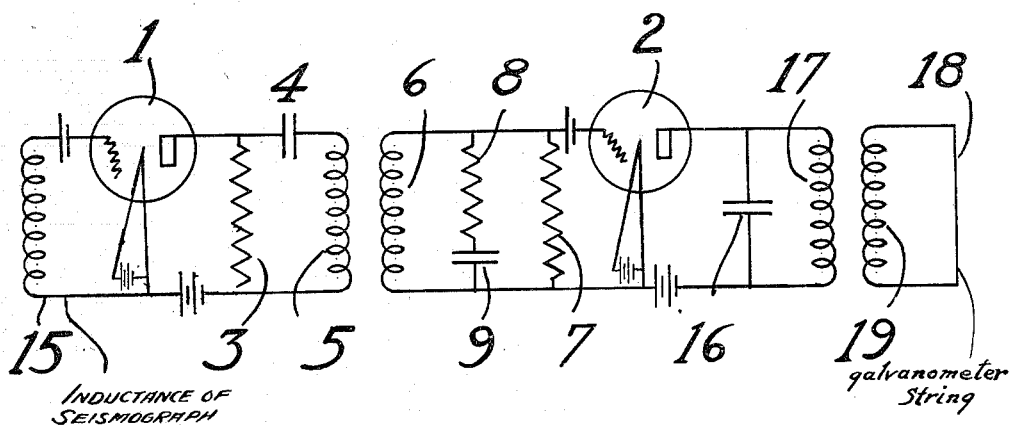
Fig. 4 is a diagrammatic representation of an arrangement of apparatus for reflection shooting.

Referring particularly to Fig. 4, the electrical circuit of Fig. 3 is shown with the inductance 15 of an electrical seismograph connected across the grid of the vacuum tube 1. The vacuum tube 2 is connected through its plate circuit with a condenser 16 and the primary 17 of a transformer in parallel. A galvanometer string 18 is connected across the secondary 19 of this transformer. Fluctuation of the galvanometer string 18 due to pulsations of electric energy passing through the circuit can be recorded in any suitable manner not shown. All of the resistances 3, 7 and 8 in the figures constitute damping means.

Figure 5:
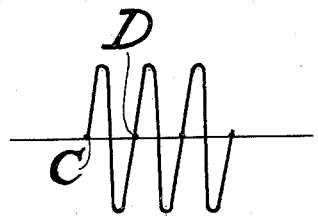
Fig. 5 is a diagrammatic representation of a reflected wave which has passed through the circuits of Figs. 2, 3 or 4.

Referring particularly to Fig. 5, a record is shown of a wave corresponding to the wave shown in Fig. 1 in which the ratio of the first cycle amplitude to second cycle amplitude has been increased. In this figure the wave arrived at the point C and the first cycle extended to the point D.

In using the construction described, the circuit is made more responsive to the frequency of the reflections by properly tuning the condenser and inductance. The circuit is then twelve times critically damped to amplify, or distort, the first arrival of the reflections. A relatively longer period of time is used in recording the first cycle as compared with the succeeding cycles of the wave. Therefore, the first cycle is given an opportunity to build up to a greater amplitude. The increase in time in recording the first cycle, whereby the first cycle is made longer, is the phase shift. The phase shift is due to the recording system and is independent of the length of the reflection. The phase shift comes out of the recording system during the first cycle by means of the resistance. The resistance is adjusted to constitute twelve times critical resistance.

Various changes may be made within the scope of the appended claims in which it is desired to claim all novelty inherent in the invention as broadly as the prior art permits.

I claim:

1. In means for increasing the ratio of first cycle amplitude to second cycle amplitude of electric pulsations of given amplitude, the combination of the plate and grid circuits of vacuum tubes, means for tuning the circuits to resonate to the frequency of the electric pulsations, and means for damping the circuits more than critically.

2. In means for increasing the ratio of first cycle amplitude to second cycle amplitude of electric pulsations of given amplitude, the combination of a plate resistor of a vacuum tube, a condenser, and the inductance of the primary winding of a transformer all connected in series, and damping resistances for damping the circuits more than critically connected to the secondary winding of the transformer.

3. In means for increasing the ratio of first cycle amplitude to second cycle amplitude of electric pulsations of given amplitude, the combination of a plate resistor of a vacuum tube, a condenser and the inductance of the primary winding of a transformer all connected in series, damping resistances for damping the circuits more than critically connected to the secondary winding of the transformer, and a second condenser and a second damping resistance, the second condenser and second resistance forming a unit connected in series, the unit being connected in parallel with the secondary of the transformer.

4. In combination with the inductance coil of a seismograph for transforming earth vibrations into electric pulsations, a circuit connected to the coil, means for tuning the circuit to resonate to the frequency of the particular electric pulsations caused by the portion of the earth vibrations of a given frequency, and means for damping the circuit more than critically whereby the ratio of first cycle amplitude to second cycle amplitude of the particular electric pulsations is increased.

5. In combination with the inductance coil of a seismograph for transforming earth vibrations into electric pulsations, a combination of plate and grid circuits of vacuum tubes connected to the coil, means for tuning the circuits to resonate to the frequency of the particular electric pulsations caused by the portion of the earth vibrations of a given frequency, and means for damping the circuits more than critically whereby the ratio of first cycle amplitude to second cycle amplitude of the particular electric pulsations is increased.

6. In combination with the inductance coil of a seismograph for transforming earth vibrations into electric pulsations, a circuit connected to the coil and including in combination a plate resistor of a vacuum tube, a condenser and the inductance of the primary winding of a transformer all connected in series for tuning the circuit to resonate to the frequency of the particular electric pulsations caused by the portion of the earth vibrations of a given frequency, and damping resistances for damping the circuits more than critically connected to the secondary winding of the transformer whereby the ratio of first cycle amplitude to second cycle amplitude of the particular electric pulsations is increased.

7. In combination with the inductance coil of a seismograph for transforming earth vibrations into electric pulsations, a circuit connected to the coil including the combination of a plate resistor of a vacuum tube, a condenser, and the inductance of the primary winding of a transformer all connected in series for tuning the circuit to resonate to the frequency of the particular electric pulsations caused by the portion of the earth vibrations of a given frequency, damping resistances for damping the circuits more than critically connected to the secondary winding of the transformer, and a second condenser and a second damping resistance, the second condenser and second resistance forming a unit connected in series, the unit being connected in parallel with the secondary of the transformer whereby the ratio of first cycle amplitude to second cycle amplitude of the particular electric pulsations is increased.

8. Apparatus for recording seismic waves, which comprises means for transforming the waves into electric pulsations, means for transmitting the pulsations along an electric circuit, means for tuning the circuit to the frequency of the particular electric pulsations caused by the portion of the earth vibrations of a given frequency, and means for damping the circuit whereby the ratio of first cycle amplitude to second cycle amplitude of the particular electric pulsations is increased.

9. In seismic prospecting in which earth vibrations are produced the first cycles of each of which are smaller than the later cycles, apparatus for recording the beginning of the vibrations which comprises means for transforming the vibrations into electric pulsations, means for transmitting the pulsations along an electric circuit, means for tuning the circuit to the frequency of the particular electric pulsations caused by the portion of the earth vibrations of predominant frequency, means for damping the circuit more than critically whereby the ratio of first cycle amplitude to second cycle amplitude of the particular electric pulsations is increased, and means for recording the amplified first cycle.

10. Apparatus for recording seismic waves, which comprises means for transforming the waves into electric pulsations, means for transmitting the pulsations along an electric circuit, means for tuning the circuit to the frequency of the particular electric pulsations caused by the portion of the earth vibrations of predominant frequency, and means for damping the circuit whereby the ratio of first cycle amplitude to second cycle amplitude of the particular electric pulsations is increased.

11. Apparatus for recording vibrations, which comprises means for transforming the vibrations into electric pulsations, means for transmitting the pulsations along an electric circuit, means for tuning the circuit to the frequency of the particular electric pulsations caused by the portion of the vibrations of a given frequency, and means for damping the circuit more than critically whereby the ratio of first cycle amplitude to second cycle amplitude of the particular electric pulsations is increased.

LUDWIG W. BLAU.